US011316705B1

(12) United States Patent
Spiessens

(10) Patent No.: US 11,316,705 B1
(45) Date of Patent: Apr. 26, 2022

(54) IMAGE SENSORS WITH A PHYSICAL UNCLONABLE FUNCTION

(71) Applicant: SEMICONDUCTOR COMPONENTS INDUSTRIES, LLC, Phoenix, AZ (US)

(72) Inventor: Peter Spiessens, Werchter (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 64 days.

(21) Appl. No.: 16/949,386

(22) Filed: Oct. 28, 2020

(51) Int. Cl.
*H04L 9/32* (2006.01)
*H04N 5/378* (2011.01)
*H04N 5/369* (2011.01)

(52) U.S. Cl.
CPC ........... *H04L 9/3278* (2013.01); *H04N 5/378* (2013.01); *H04N 5/379* (2018.08)

(58) Field of Classification Search
CPC ....... H04N 5/378; H04N 5/379; H04L 9/3278
See application file for complete search history.

(56) References Cited

U.S. PATENT DOCUMENTS

| | | | | |
|---|---|---|---|---|
| 7,129,973 | B2 * | 10/2006 | Raynor | H04N 1/32128 348/231.3 |
| 7,663,670 | B1 * | 2/2010 | Orboubadian | H04N 9/8042 348/231.2 |
| 2002/0191091 | A1 | 12/2002 | Raynor | |
| 2017/0104949 | A1 * | 4/2017 | Kim | G06F 17/16 |
| 2020/0288078 | A1 * | 9/2020 | Okura | H04N 5/374 |
| 2020/0342122 | A1 * | 10/2020 | Toyoshima | H04N 5/335 |

FOREIGN PATENT DOCUMENTS

EP  3157249  4/2017

OTHER PUBLICATIONS

Bryant et al. "A stochastic approach to analog physical unclonable function," 2016 IEEE 59th International Midwest Symposium on Circuits and Systems (MWSCAS), Abu Dhabi, 2016, pp. 1-4.

(Continued)

*Primary Examiner* — Lin Ye
*Assistant Examiner* — Chriss S Yoder, III
(74) *Attorney, Agent, or Firm* — Treyz Law Group, P.C.; Joseph F. Guihan

(57) ABSTRACT

An image sensor may use a physical unclonable function (PUF) to generate a unique identifier that may be used for security. Physical unclonable functions utilize variations that occur during manufacturing to generate a unique identifier that may be used to generate a secure encryption key. In an image sensor, analog-to-digital converters may provide the foundation for the physical unclonable function. An image sensor may include an array of imaging pixels having rows and columns, a plurality of analog-to-digital converters, and processing circuitry that is configured to generate a unique identifier based on outputs from the plurality of analog-to-digital converters. The processing circuitry may concatenate one or more bits from test outputs from the analog-to-digital converters to generate the unique identifier.

20 Claims, 5 Drawing Sheets

(56) References Cited

OTHER PUBLICATIONS

Tang et al. "A Physical Unclonable Function based on Capacitor Mismatch in a Charge-Redistribution SAR-ADC," 2018 IEEE International Symposium on Circuits and Systems (ISCAS), Florence, 2018, pp. 1-5.
Cao et al. "CMOS Image Sensor Based Physical Unclonable Function for Coherent Sensor-Level Authentication," EEE Transactions on Circuits and Systems I: Regular Papers, vol. 62, No. 11, pp. 2629-2640, Nov. 2015.
Colombier et al. "Key Reconciliation Protocols for Error Correction of Silicon PUF Responses," IEEE Transactions on Information Forensics and Secrutiy, Vo. 12, No. 8, Aug. 2017.
Delvaux et al. "Helper Data Algorithms for PUF-Based Key Generation: Overview and Analysis," IEEE Transactions on Computer-Aided Design of Integrated Circuits and Systems, 34(6):889-902, Jun. 2015.
Yu et al. "Secure and Robust Error Correction for Physical Unclonable Functions," IEEE Design and Test, 27(1):48-65, Nov. 2010.

\* cited by examiner

IMAGE SENSORS WITH A PHYSICAL UNCLONABLE FUNCTION

BACKGROUND

This relates generally to image sensors. Image sensors are commonly used in electronic devices such as cellular telephones, cameras, and computers to capture images. In a typical arrangement, an electronic device is provided with an array of image pixels arranged in pixel rows and pixel columns. Each image pixel in the array includes a photodiode that is coupled to a floating diffusion region via a transfer gate. Each pixel receives incident photons (light) and converts the photons into electrical signals. Column circuitry is coupled to each pixel column for reading out pixel signals from the image pixels. Image sensors are sometimes designed to provide images to electronic devices using a Joint Photographic Experts Group (JPEG) format.

It may be important for image sensors to meet cybersecurity requirements and ensure that generated image data is secure.

DETAILED DESCRIPTION

Figure 1:
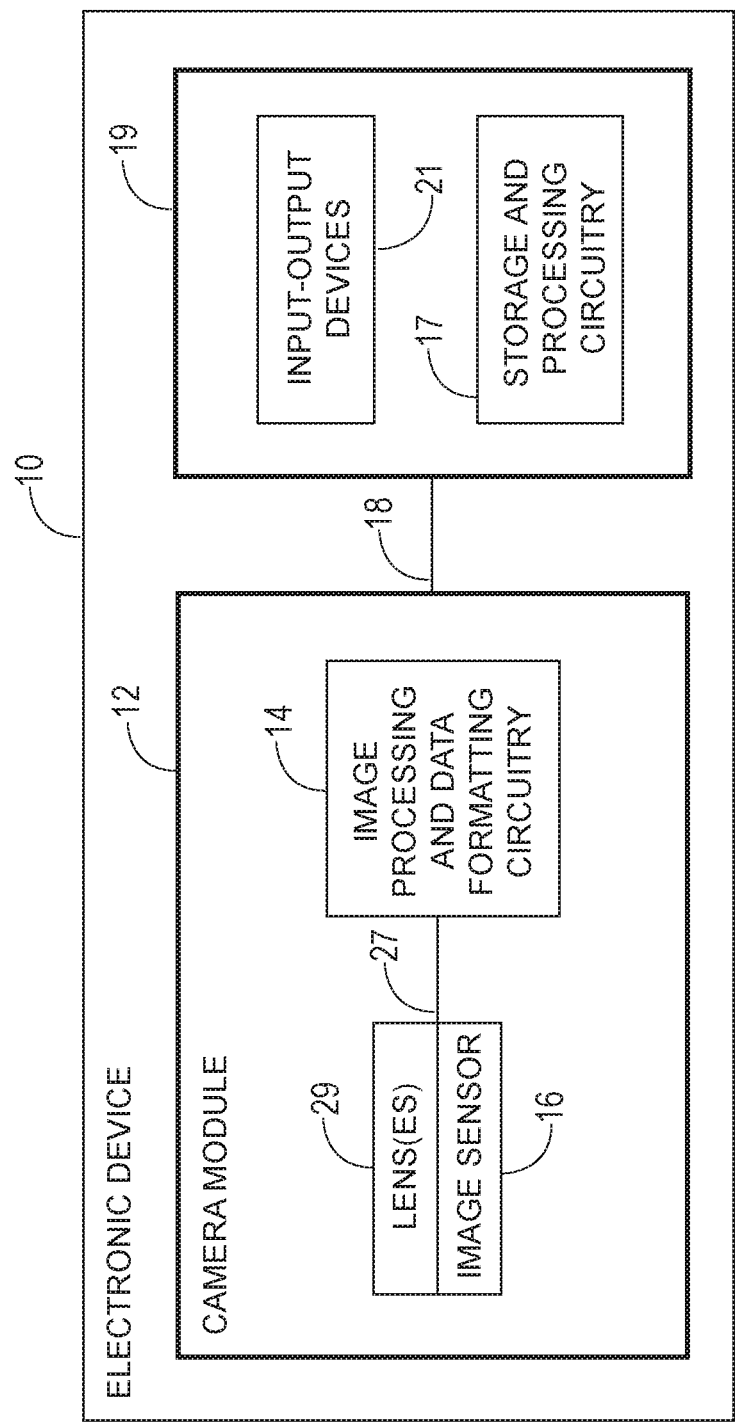
FIG. 1 is a schematic diagram of an illustrative electronic device that may include an image sensor in accordance with an embodiment.

Embodiments of the present invention relate to image sensors that leverage a physical unclonable function (PUF) to generate a unique identifier that may be used for security. An electronic device with a digital camera module is shown in FIG. 1. Electronic device 10 may be a digital camera, a computer, a cellular telephone, a medical device, or other electronic device. Camera module 12 (sometimes referred to as an imaging device) may include image sensor 16 and one or more lenses 29. During operation, lenses 29 (sometimes referred to as optics 29) focus light onto image sensor 16. Image sensor 16 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 16 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 16 may be provided to image processing and data formatting circuitry 14 via path 27. Image processing and data formatting circuitry 14 may be used to perform image processing functions such as automatic focusing functions, depth sensing, data formatting, adjusting white balance and exposure, implementing video image stabilization, face detection, etc. For example, during automatic focusing operations, image processing and data formatting circuitry 14 may process data gathered by phase detection pixels in image sensor 16 to determine the magnitude and direction of lens movement (e.g., movement of lens 29) needed to bring an object of interest into focus.

Image processing and data formatting circuitry 14 may also be used to compress raw camera image files if desired (e.g., to Joint Photographic Experts Group or JPEG format). In a typical arrangement, which is sometimes referred to as a system on chip (SOC) arrangement, camera sensor 16 and image processing and data formatting circuitry 14 are implemented on a common integrated circuit. The use of a single integrated circuit to implement camera sensor 16 and image processing and data formatting circuitry 14 can help to reduce costs. This is, however, merely illustrative. If desired, camera sensor 16 and image processing and data formatting circuitry 14 may be implemented using separate integrated circuits. If desired, camera sensor 16 and image processing circuitry 14 may be formed on separate semiconductor substrates. For example, camera sensor 16 and image processing circuitry 14 may be formed on separate substrates that have been stacked.

Camera module 12 may convey acquired image data to host subsystems 19 over path 18 (e.g., image processing and data formatting circuitry 14 may convey image data to subsystems 19). Electronic device 10 typically provides a user with numerous high-level functions. In a computer or advanced cellular telephone, for example, a user may be provided with the ability to run user applications. To implement these functions, host subsystem 19 of electronic device 10 may include storage and processing circuitry 17 and input-output devices 21 such as keypads, input-output ports, joysticks, and displays. Storage and processing circuitry 17 may include volatile and nonvolatile memory (e.g., random-access memory, flash memory, hard drives, solid state drives, etc.). Storage and processing circuitry 17 may also include microprocessors, microcontrollers, digital signal processors, application specific integrated circuits, or other processing circuits.

Figure 2:
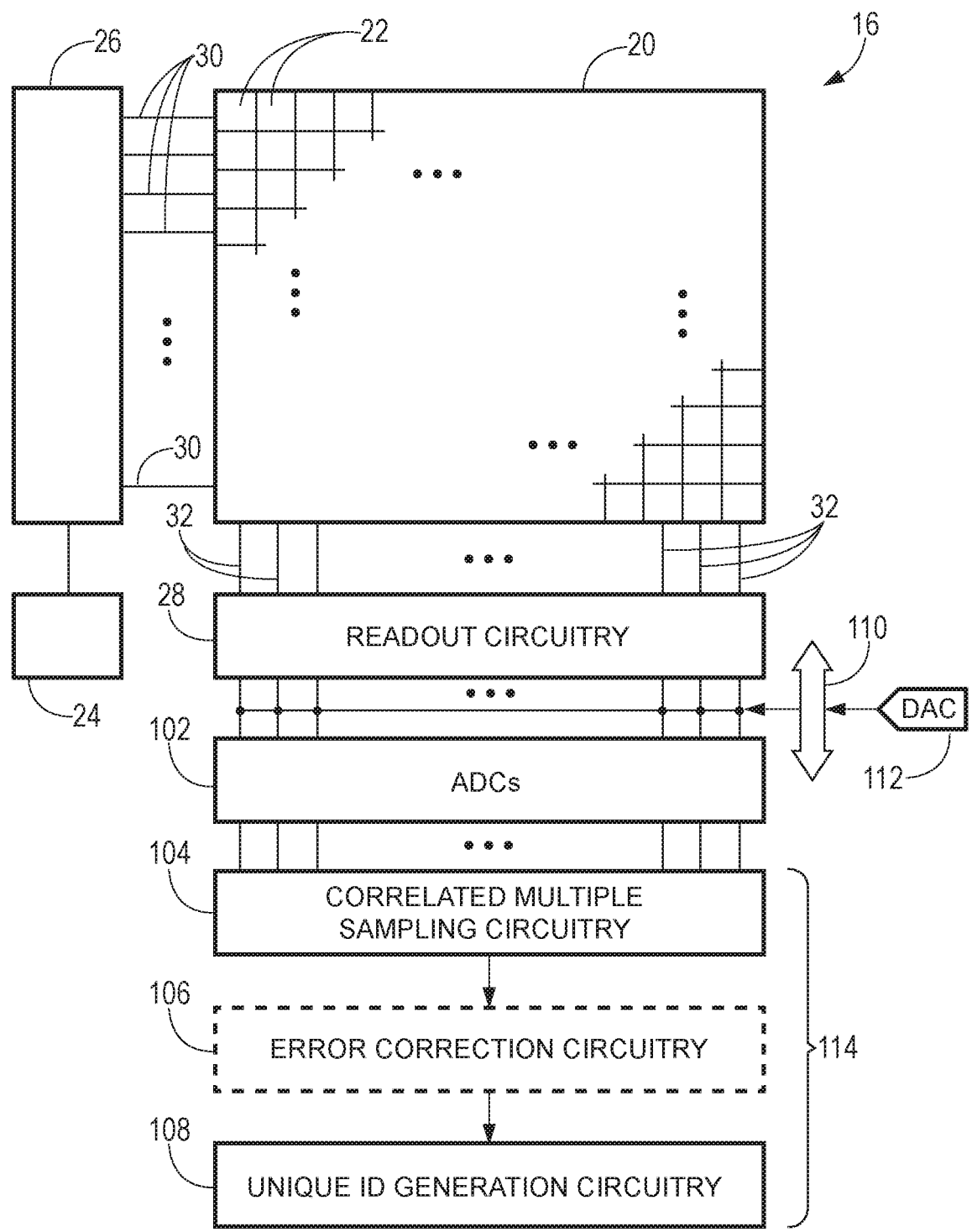
FIG. 2 is a diagram of an illustrative image sensor that includes an array of imaging pixels and unique identification generation circuitry that is configured to generate a unique identification for the image sensor using a physical unclonable function in accordance with an embodiment.

As shown in FIG. 2, image sensor 16 may include pixel array 20 containing image sensor pixels 22 arranged in rows and columns (sometimes referred to herein as image pixels or pixels) and control and processing circuitry 24 (which may include, for example, image signal processing circuitry). Image sensor pixels 22 may be complementary metal-oxide-semiconductor (CMOS) image sensor pixels or may be charge coupled device (CCD) image sensor pixels. Array 20 may contain, for example, hundreds or thousands of rows and columns of image sensor pixels 22. Control circuitry 24 may be coupled to row control circuitry 26 and/or image readout circuitry 28 (sometimes referred to as column control circuitry, readout circuitry, processing circuitry, or column decoder circuitry). Pixel array 20, control and processing circuitry 24, row control circuitry 26, and image readout circuitry 28 may be formed on a substrate. If desired, image sensor 16 may be formed on multiple substrates that are connected (e.g., through wire bonding or flip-chip bonding).

Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, latch circuitry for selectively enabling or disabling the column circuitry, testing circuitry, and/or other circuitry that is coupled to one or more columns of pixels in array 20 for operating pixels 22 and for reading out image signals from pixels 22.

Array 20 may have any number of rows and columns. In general, the size of array 20 and the number of rows and columns in array 20 will depend on the particular implementation of image sensor 16. While rows and columns are generally described herein as being horizontal and vertical, respectively, rows and columns may refer to any grid-like structure (e.g., features described herein as rows may be arranged vertically and features described herein as columns may be arranged horizontally).

Pixel array 20 may be provided with a color filter array having multiple color filter elements which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 22.

If desired, array 20 may be part of a stacked-die arrangement in which pixels 22 of array 20 are split between two or more stacked substrates. In such an arrangement, each of the pixels 22 in the array 20 may be split between the two dies at any desired node within the pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any metal-to-metal bonding technique, such as soldering or welding.

As mentioned above, the desired node in the pixel circuit that is split across the two dies may be a floating diffusion node. Alternatively, the desired node in the pixel circuit that is split across the two dies may be the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source follower transistor and a row select transistor, or any other desired node of the pixel circuit.

In general, the components of images sensor 16 (e.g., array 20, row control circuitry 26, column control and readout circuitry 28, etc.) may be split between two or more stacked substrates. In one example, array 20 may be formed in a first substrate and row control circuitry 26 and column control and readout circuitry 28 may be formed in a second substrate. In another example, array 20 may be split between first and second substrates (using one of the pixel splitting schemes described above) and row control circuitry 26 and column control and readout circuitry 28 may be formed in a third substrate.

It may be important for image sensor 16 to meet cybersecurity requirements and ensure that generated image data is secure. To ensure data security, one or more cybersecurity authentication techniques may be used. An example of a cybersecurity authentication technique is a physical unclonable function (PUF). Physical unclonable functions utilize variations that occur during manufacturing to generate a unique identifier that may be used to generate a secure encryption key. The secure encryption key (based on the PUF) may be the foundation of a security subsystem in the image sensor.

In image sensor 16, variation between analog-to-digital converters may provide the foundation for the physical unclonable function. As shown in FIG. 2, image sensor 16 may include a plurality of analog-to-digital converters (ADCs) 102. Each column line 32 may be coupled to a respective ADC. In other words, there may be one ADC for each column of pixels in array 20. Alternatively, other ADC arrangements may be used if desired. Readout circuitry 28 may provide analog signals for every column in a given row to the ADCs on column lines 32.

It should be noted that readout circuitry 28 and/or analog-to-digital conversion (ADC) circuitry 102 may also include bias circuitry, column memory, latch circuitry for selectively enabling or disabling the column circuitry, testing circuitry, and/or other circuitry that is coupled to one or more columns of pixels in array 20 for operating pixels 22 and for reading out image signals from pixels 22.

Ideally, the ADCs should each produce the same digital output for a given input voltage. For example, if every ADC is provided a voltage of exactly 1 V, every ADC would provide an identical digital output. In practice, however, non-idealities and random variations (e.g., produced during manufacturing) may cause differences in the outputs of the ADCs. Again considering the example where every ADC is provided a voltage of exactly 1 V, each ADC may provide a slightly different digital output. The ADCs may provide outputs having 10 bits, 12 bits, less than 15 bits, more than 6 bits, between 8 and 14 bits, or any other desired number of bits.

The varying outputs of the ADCs for a known input may be used as a physical unclonable function for the image sensor. The digital outputs of the ADCs may be used to generate a unique identifier (ID) for the image sensor.

In some situations, temperature variations, voltage variations, and/or long-term use of the image sensor may cause changes in the outputs of the ADC. Additional circuitry may be included to improve robustness of the physical unclonable function (e.g., to ensure that the same unique identifier is repeatedly generated over time). For example, the image sensor may include correlated multiple sampling circuitry 104. The correlated multiple sampling circuitry 104 may gather multiple samples from each ADC (e.g., to reduce thermal noise). For example, four digital samples may be gathered from a first ADC while the input to the first ADC remains constant. The four digital samples may then be averaged by correlated multiple sampling circuitry 104 to obtain a single representative value.

The example of circuitry 104 gathering four samples is merely illustrative. In general, circuitry 104 may gather any desired number of samples from a given ADC (e.g., one, two, three, four, more than four, more than eight, more than fifteen, more than twenty, nine, sixteen, twenty-five, less than forty, etc.). The gathered samples may be averaged to generate a representative output for the given ADC.

Additionally, error correction circuitry 106 may optionally be included to increase the robustness of the physical unclonable function. Error correction circuitry 106 may, for example, apply error correction code (ECC) techniques, majority voting techniques, and/or histogram techniques to the ADC outputs to prevent undesired changes in the unique identifier.

After the processing by circuitry 104 and 106 is complete, the digital value associated with each ADC may be used to generate a unique identification (sometimes referred to as unique identifier, unique signature, unique ID, unique security identification, security identification, etc.). The digital value associated with each ADC may be referred to as an ADC output both before and after the processing is performed by circuitry 104 and 106. The unique identifier may be generated by unique ID generation circuitry 108 using the ADC outputs. The unique identifier may be a concatenation of one or more bits from one or more ADC outputs.

In general, the unique ID may be generated using the ADC outputs in any desired manner. Consider an example where pixel array 20 includes 1,024 columns of pixels and each ADC outputs 12 bits. In this scenario, there are 12,288 bits output from the ADCs that may be used to form the unique identifier. In practice, the unique identifier may not require so many bits. Depending on the application, the unique identifier may have any desired number of bits (e.g., 128, 512, 1,024, more than 64, less than 5,000, etc.). Therefore, not all of the bits output from the ADCs may be used to generate the unique identifier. The total number of bits output from the ADCs (12,288 in the example above) may be referred to as a bank of bits that may be used to generate the unique identifier. However, only a subset of the bank of bits may actually be used to form the unique identifier. For example, unique ID generation circuitry 108 may only use a subset of bits from each output and/or may only use a subset of ADC outputs in forming the unique ID. The unique ID generation circuitry 108 may optionally perform mathematical functions while generating the unique ID. Alternatively, the unique ID generation circuitry may simply concatenate bits from the bank to form the unique ID.

Image sensor 16 includes an analog test bus 110 that supplies a test voltage to the ADCs for generating the physical unclonable function. During generation of the unique ID, a digital-to-analog converter (DAC) 112 may supply a voltage to analog test bus 110. The analog test bus 110 provides the voltage to every ADC 102. The voltage therefore serves as the input voltage to prompt the ADC outputs that are used for unique ID generation. In general, the voltage supplied to the ADCs during unique ID generation may have any desired magnitude.

Correlated multiple sampling circuitry 104, error correction circuitry 106, and unique identification generation circuitry 108 may collectively be referred to as processing circuitry 114, ADC processing circuitry 114, ADC output processing circuitry 114, etc.

It should be noted that, to create the unique ID, the ADC outputs may be used directly or a difference between the ADC outputs and an expected ADC output may be used. For example, a digital signal is provided to DAC 112 that prompts the voltage received by ADCs 102 to have a given magnitude. Once converted back to the digital domain by ADCs 102, the ADC outputs should be approximately the same as the original input to DAC 112. If desired, the difference between the ADC outputs and the input to DAC 112 may be used during unique ID generation.

Figure 3:
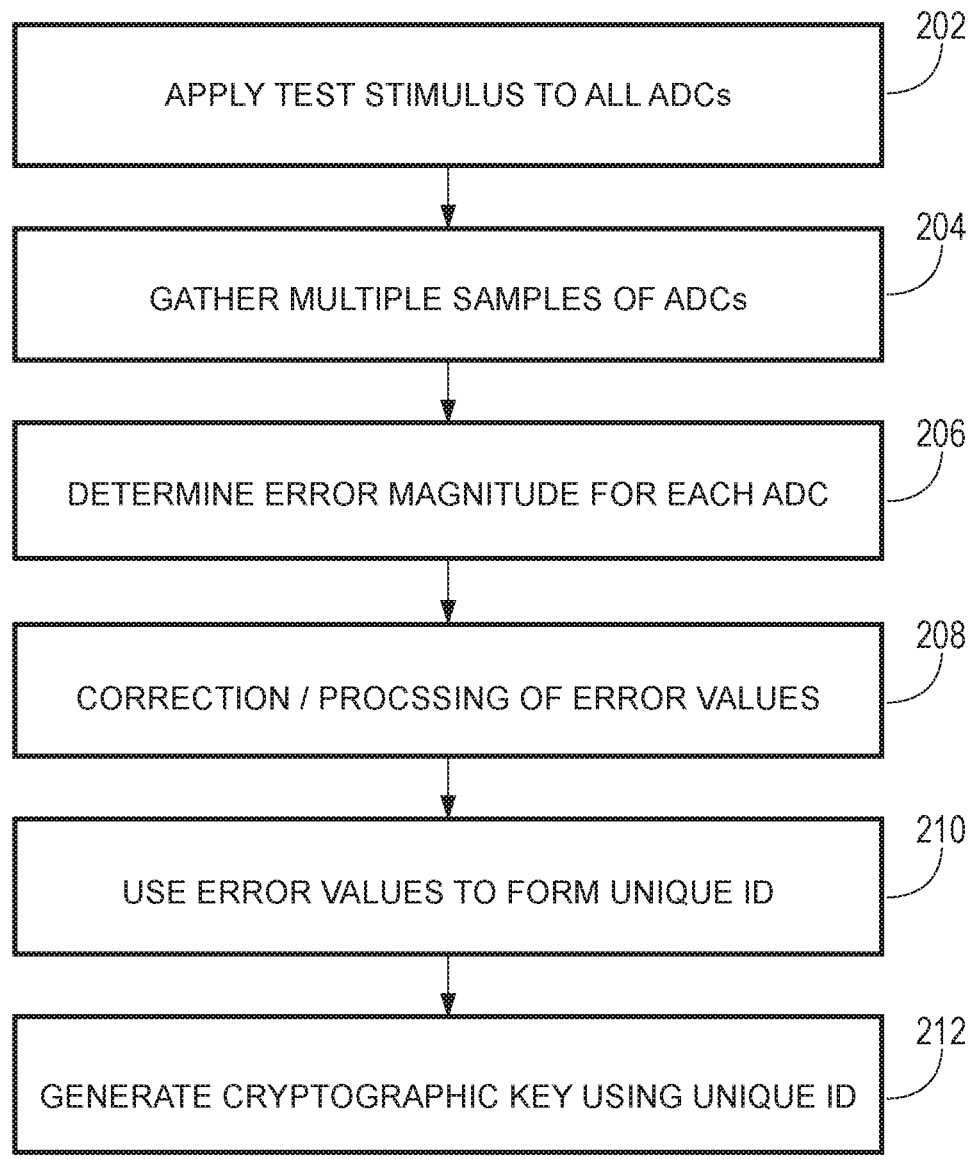
FIG. 3 is a flowchart showing illustrative method steps for operating an image sensor that includes unique identification generation circuitry such as the image sensor of FIG. 2 in accordance with an embodiment.

FIG. 3 is a flowchart of illustrative method steps that may be used to operate an image sensor of the type shown in FIG. 2. In particular, the image sensor may be operated to generate a cryptographic key using a unique identifier that is based on a physical unclonable function. First, at step 202, a test stimulus may be applied to the analog-to-digital converters 102. As shown in FIG. 2, the test stimulus may be applied using analog test bus 110. The test stimulus is a signal having a voltage with a predetermined value. The test stimulus may sometimes be referred to as a test voltage, predetermined voltage, etc.

The test voltage may applied to the ADCs using a digital-to-analog converter 112. The DAC 112 may apply the same test voltage to every ADC or may optionally provide different test voltages to different ADCs. During each instance of unique identifier generation, the DAC may use the same test voltage scheme. Therefore, each ADC receives the same test voltage each time the unique identifier is generated. This allows the same unique identifier to be generated repeatedly over time.

The test voltages received by each ADC during step 202 may have any desired magnitude (e.g., less than 10 V, less than 5 V, less than 2 V, less than 1 V, greater than 0.5 V, between 0.1 and 10 V, between 0.1 and 3 V, etc.). The test voltage received by each ADC may have the same magnitude or different ADCs may receive test voltages having different magnitudes.

Next, at step 204, correlated multiple sampling circuitry 104 may be used to gather multiple samples from the ADCs. Each ADC has a corresponding digital output. However, variations caused by factors such as temperature may result in small changes in the digital output over time. Correlated multiple sampling circuitry 104 may obtain multiple digital outputs from a given ADC at different times. These multiple digital outputs may be averaged or otherwise processed to obtain a single representative value associated with the given ADC. This process may be repeated for each ADC to obtain a representative digital value for each ADC.

The representative digital value for each ADC determined by correlated multiple sampling circuitry 104 may be based on any desired number of samples from the respective ADC (e.g., 2 or more samples, 3 or more samples, 4 or more samples, 10 or more samples, 20 or more samples, less than 20 samples, between 2 and 20 samples, between 2 and 10 samples, etc.). The larger the number of samples obtained for each ADC by multiple sampling circuitry 104, the more thermal noise is reduced.

The outputs from correlated multiple sampling circuitry 104 may optionally be processed to obtain an error value. For example, a first ADC may receive a test voltage of 1.0000 V at step 202. During step 204, four samples of the output from the first ADC may be obtained and averaged. The averaged result obtained by correlated multiple sampling circuitry may be a digital value corresponding to 1.0001 V.

Either the average ADC output (1.0001 V) or an error value may be used for future unique identifier generation steps. The error value (sometimes referred to as error magnitude) is the difference between the ADC output and the test input. In the aforementioned example, the ADC has an output of 1.0001 V for an input test voltage of 1.0000 V. Therefore, the error value in this case would be 0.0001 V. Either 1.0001 V (the ADC output) or 0.0001 V (the error value for the ADC) may be used for subsequent processing.

In the example of FIG. 3, the error magnitude may be determined for each ADC in the image sensor at step 206. The error magnitude may determine using correlated multiple sampling circuitry 104, error correction circuitry 106, unique ID generation circuitry 108, or other circuitry within processing circuitry 114. The error magnitude may be used for the subsequent steps in FIG. 3. However, it should be understood that, if desired, the ADC output values may be used instead of the error values for subsequent processing in FIG. 3.

At step 208, error correction circuitry 106 may be used to correct and/or process the error values from step 206. This step may optionally be included to increase the robustness of the physical unclonable function. Error correction circuitry 106 may, for example, apply error correction code (ECC) techniques, majority voting techniques, and/or histogram techniques to the ADC outputs to prevent undesired changes in the unique identifier.

Next, at step 210, the error values (as corrected during step 208) may be used to form a unique identifier for the image sensor. There are innumerable ways to generate the unique identifier. Unique identification circuitry 108 may concatenate all of the error values to form the unique identifier. Alternatively, a subset of bits from all of the error values may be concatenated to form the unique identifier. All of the bits in some but not all of the error values may be concatenated to form the unique identifier. Some but not all of the bits from some but not all of the error values may be concatenated to form the unique identifier. The unique ID generation circuitry 108 may also optionally perform mathematical functions while generating the unique ID. FIG. 4 shows a few detailed examples of how the unique identification circuitry may generate the unique identifier for the image sensor.

After generating the unique identifier at step 210, the image sensor may generate a cryptographic key using the unique identifier at step 212. The cryptographic key may be a function of the unique identifier. Any desired manipulation (e.g., mathematical functions, bit selection, etc.) may be used to form the cryptographic key based on the unique identifier. The cryptographic key may be used in combination with an encryption algorithm to encrypt data from the image sensor (e.g., data corresponding to an image frame, metadata, etc.).

Figure 4A:
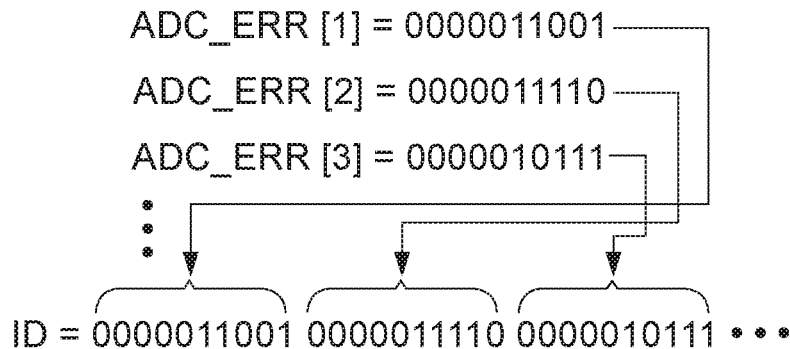
FIG. 4A is a diagram showing how a unique identifier may be formed by a concatenation of values associated with each analog-to-digital converter in an image sensor in accordance with an embodiment.
Figure 4B:
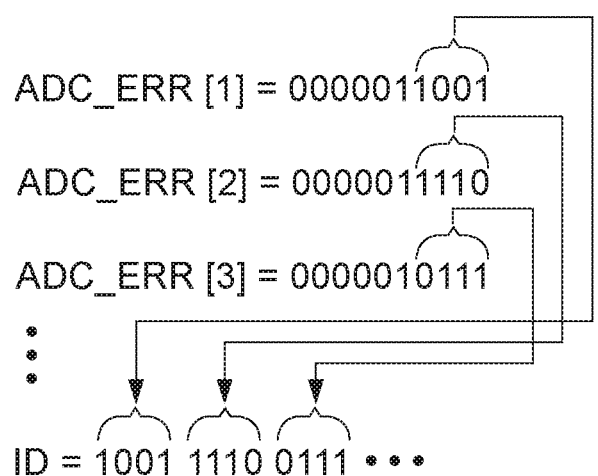
FIG. 4B is a diagram showing how a unique identifier may be formed by a concatenation of a subset of bits of values associated each analog-to-digital converter in an image sensor in accordance with an embodiment.
Figure 4C:
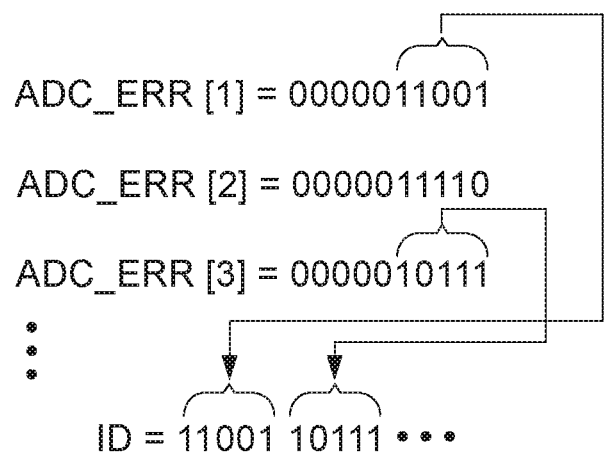
FIG. 4C is a diagram showing how a unique identifier may be formed by a concatenation of a subset of bits of values for a subset of the analog-to-digital converters in an image sensor in accordance with an embodiment.

FIGS. 4A-4C are diagrams showing different ways to form a unique identifier for the image sensor. FIG. 4A shows a first unique identifier generation scheme in which each error value (in its entirety) is concatenated to form the unique identifier. Three error values are shown in FIG. 4A. ADC_ERR[1] has a digital value of 0000011001, ADC_ERR[2] has a digital value of 0000011110, and ADC_ERR[3] has a digital value of 0000010111. In this example, the error values have 10 bits. All 10 bits of each error value are used to form the unique identifier. As shown, the 10 bits of ADC_ERR[1] may be used to form the first 10 bits of the unique identifier. The 10 bits of ADC_ERR[2] are used to form the next 10 bits of the unique identifier. The 10 bits of ADC_ERR[3] are used to form the next 10 bits of the unique identifier. This pattern may repeat such that all of the error values are concatenated to form the unique identifier.

In another possible embodiment, shown in FIG. 4B, only a subset of the bits (e.g., less than the total number of bits) of each error value may be used to form the unique identifier. In FIG. 4B, ADC_ERR[1], ADC_ERR[2], and ADC_ERR[3] are the same as in FIG. 4A. However, only the 4 least significant bits of each value are used for the unique identifier generation. As shown, the last 4 bits (e.g., the 4 least significant bits) of ADC_ERR[1] are used to form the first 4 bits (1001) of the unique identifier. The last 4 bits (e.g., the 4 least significant bits) of ADC_ERR[2] are used to form the next 4 bits (1110) of the unique identifier. The last 4 bits (e.g., the 4 least significant bits) of ADC_ERR[3] are used to form the next 4 bits (0111) of the unique identifier. This pattern may repeat with the last 4 bits of each error value being concatenated to form the unique identifier.

In another possible embodiment, shown in FIG. 4C, only a subset of the error values (e.g. less than the total number of the error values) may be used to form the unique identifier. In FIG. 4C, ADC_ERR[1], ADC_ERR[2], and ADC_ERR[3] are the same as in FIG. 4A and FIG. 4B. However, not all of the error values are used for unique identifier generation. As shown, ADC_ERR[2] may not be used to form the unique identifier. In this example, every other error value may be used for unique identifier generation whereas every other error value may not be used (and may be discarded).

The last 5 bits of ADC_ERR[1] (e.g., the 5 least significant bits) are used to form the first 5 bits (11001) of the unique identifier. ADC_ERR[2] may not be used to form the unique identifier. The last 5 bits (e.g., the 5 least significant bits) of ADC_ERR[3] are used to form the next 5 bits (10111) of the unique identifier. This pattern may repeat with the last 5 bits of every other error value being concatenated to form the unique identifier.

The specific examples of FIGS. 4A-4C are merely illustrative. In general, all of the error values or any subset of error values may be used for unique identifier generation.

The subset of error values used may be a regular pattern (e.g., the error value for every other ADC may be used, the error value for every third ADC may be used, the error value for every fourth ADC may be used, etc.). Alternatively, the subset of error values used may be an irregular pattern (e.g., error values from a random assortment of the ADCs may be used). If an ADC is not used for the unique identifier generation, data from that ADC may be discarded during unique identifier generation. Alternatively, data from the unused ADCs may not be obtained in the first place during the sampling steps.

For each error value that is used in unique identifier generation, all of its bits or any subset of its bits may be used. In FIG. 4B, four bits from each error value are used. In FIG. 4C, five bits from each error value are used. These examples are merely illustrative. The number of bits used from each error value may have any desired magnitude (e.g., one, two, three, four, five, six, more than six, more than eight, less than six, less than five, less than four, etc.). The bits used from each error value may be the least significant bits (as in FIGS. 4B and 4C) or may not be the least significant bits. The bits used from each error value may be consecutive bits (as in FIGS. 4B and 4C) or may not be consecutive. For example, the first, third, and fifth bits from a given error value may be used. The same bits may be used for every error value or different bits may be used from different error values.

It should be understood that the techniques shown in FIGS. 4A-4C may be applied to any digital values. In FIGS. 4A-4C, the digital values are error values. However, the digital values may instead be the ADC outputs as previously discussed. In this case, the same unique identifier techniques as discussed above all still apply.

Figure 5:
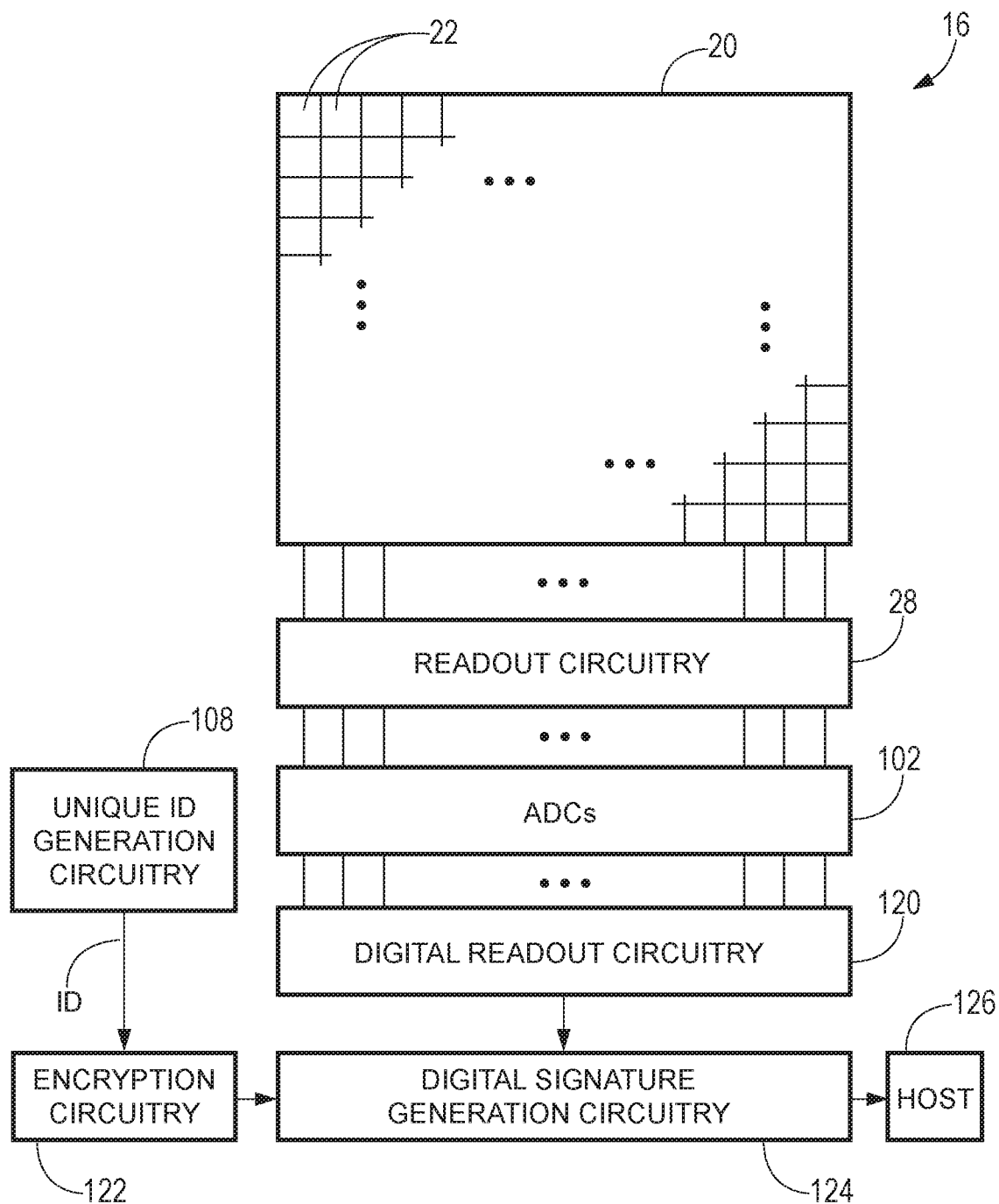
FIG. 5 is a diagram of an illustrative image sensor with encryption circuitry that is configured to use a unique identifier in accordance with an embodiment.

FIG. 5 is a schematic diagram of an image sensor showing how the unique identifier may be used to encrypt data. As shown, readout circuitry 28 may sample analog values from pixels 22 in array 20. The analog values may be converted to digital values by ADCs 102. The digital values from ADCs 102 may be obtained, stored, and optionally processed by digital readout circuitry 120. The digital readout circuitry 120 therefore obtains digital data for each frame obtained by the image sensor.

Unique identification generation circuitry 108 may generate a unique identifier (e.g., using the steps of FIG. 3). As previously discussed, the unique identifier is based on a physical unclonable function associated with the ADCs of the image sensor. The unique identifier may be provided to encryption circuitry 122. Encryption circuitry 122 may generate a cryptographic key using the unique identifier (as in step 212 in FIG. 3, for example). The cryptographic key may then be used by digital signature generation circuitry 124 to produce a digital signature associated with image data from digital readout circuitry 120. The digital signature and digital image data may then be provided to a host 126 for additional action. Host 126 may be, for example, a system host that is configured to communicate with other components in a system, communicate with external devices, perform additional processing and/or formatting, etc.

The example in FIG. 5 of using the unique identifier to generate a cryptographic key that is in turn used to generate a digital signature is merely illustrative. In general, the unique identifier may be used for any desired security scheme or other desired application.

The foregoing is merely illustrative and various modifications can be made to the described embodiments. The foregoing embodiments may be implemented individually or in any combination.

What is claimed is:

1. An image sensor comprising:
an array of imaging pixels having rows and columns;
a plurality of analog-to-digital converters, wherein each column of imaging pixels has a corresponding analog-to-digital converter of the plurality of analog-to-digital converters; and
processing circuitry that is configured to generate a unique identifier based on outputs from the plurality of analog-to-digital converters.

2. The image sensor defined in claim 1, wherein the processing circuitry is configured to generate a cryptographic key using the unique identifier.

3. The image sensor defined in claim 1, wherein each analog-to-digital converter has a respective output with a total number of bits and wherein generating the unique identifier based on the outputs from the plurality of analog-to-digital converters comprises using the total number of bits from the respective output of each analog-to-digital converter to generate the unique identifier.

4. The image sensor defined in claim 1, wherein each analog-to-digital converter has a respective output with a total number of bits and wherein generating the unique identifier based on the outputs from the plurality of analog-to-digital converters comprises using less than the total number of bits from the respective output of each analog-to-digital converter to generate the unique identifier.

5. The image sensor defined in claim 1, wherein each analog-to-digital converter has a respective output with a total number of bits and wherein generating the unique identifier based on the outputs from the plurality of analog-to-digital converters comprises using the total number of bits from less than all of the respective outputs to generate the unique identifier.

6. The image sensor defined in claim 1, wherein each analog-to-digital converter has a respective output with a total number of bits and wherein generating the unique identifier based on the outputs from the plurality of analog-to-digital converters comprises using less than the total number of bits from less than all of the respective outputs to generate the unique identifier.

7. The image sensor defined in claim 1, wherein generating the unique identifier based on the outputs from the plurality of analog-to-digital converters comprises concatenating bits from the outputs to form the unique identifier.

8. The image sensor defined in claim 1, wherein the processing circuitry includes correlated multiple sampling circuitry that is configured to obtain multiple samples from a given analog-to-digital converter.

9. The image sensor defined in claim 1, further comprising:
an analog test bus; and
a digital-to-analog converter configured to apply a test voltage to the analog test bus, wherein generating the unique identifier based on outputs from the plurality of analog-to-digital converters comprises generating the unique identifier based on outputs from the plurality of analog-to-digital converters that are obtained while the plurality of analog-to-digital converters receive the test voltage.

10. An image sensor having a unique identifier, the image sensor comprising:
an array of imaging pixels;
a plurality of analog-to-digital converters that are each configured to receive an analog signal from the array of imaging pixels;

an analog test bus that is configured to provide a test voltage to the plurality of analog-to-digital converters; and unique identification generation circuitry that is configured to generate the unique identifier based on outputs from the plurality of analog-to-digital converters that are generated while the plurality of analog-to-digital converters receive the test voltage from the analog test bus.

11. The image sensor defined in claim 10, further comprising:

correlated multiple sampling circuitry configured to, for each analog-to-digital converter of the plurality of analog-to-digital converters, obtain multiple samples at different times.

12. The image sensor defined in claim 11, wherein the correlated multiple sampling circuitry is configured to, for each analog-to-digital converter of the plurality of analog-to-digital converters, average the multiple samples to obtain a single representative output for each analog-to-digital converter.

13. The image sensor defined in claim 12, further comprising:

error correction circuitry configured to process the single representative outputs from the correlated multiple sampling circuitry.

14. The image sensor defined in claim 13, wherein the unique identification generation circuitry is configured to receive the processed single representative outputs from the error correction circuitry and wherein generating the unique identifier based on the outputs from the plurality of analog-to-digital converters comprises generating the unique identifier based on the processed single representative outputs from the error correction circuitry.

15. A method of operating an image sensor, wherein the image sensor comprises an array of imaging pixels and a plurality of analog-to-digital converters coupled to the array of imaging pixels, the method comprising:

providing a test voltage to the plurality of analog-to-digital converters;

while providing the test voltage to the plurality of analog-to-digital converters, sampling outputs from the plurality of analog-to-digital converters; and generating a unique security identifier based on the outputs from the plurality of analog-to-digital converters.

16. The method defined in claim 15, wherein sampling outputs from the plurality of analog-to-digital converters comprises obtaining multiple samples from a single analog-to-digital converter of the plurality of analog-to-digital converters.

17. The method defined in claim 16, further comprising:

averaging the multiple samples from the single analog-to-digital converter to obtain a representative output for the single analog-to-digital converter.

18. The method defined in claim 15, further comprising:

for each analog-to-digital converter, subtracting a first magnitude of an output for that analog-to-digital converter from a second magnitude of the test voltage to obtain an error value for that analog-to-digital converter, wherein generating the unique security identifier based on the outputs from the plurality of analog-to-digital converters comprises generating the unique security identifier based on the error values.

19. The method defined in claim 18, further comprising:

before generating the unique security identifier based on the error values, performing additional processing on the error values.

20. The method defined in claim 15, further comprising:

generating a cryptographic key using the unique security identifier.

* * * * *